(12) United States Patent
Chen et al.

(10) Patent No.: US 10,558,894 B2
(45) Date of Patent: *Feb. 11, 2020

(54) DUAL STAGE NEURAL NETWORK PIPELINE SYSTEMS AND METHODS

(71) Applicant: Capital One Services, LLC, McLean, VA (US)

(72) Inventors: Xi Chen, Annandale, VA (US); Mamadou Diallo, San Francisco, CA (US); Qiang Xue, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,971

(22) Filed: Feb. 21, 2019

(65) Prior Publication Data

US 2019/0266445 A1    Aug. 29, 2019

Related U.S. Application Data

(63) Continuation of application No. 15/904,964, filed on Feb. 26, 2018, now Pat. No. 10,262,235.

(51) Int. Cl.
| | |
|---|---|
| *G06K 9/00* | (2006.01) |
| *G06K 9/62* | (2006.01) |
| *G06K 9/34* | (2006.01) |
| *G06N 3/04* | (2006.01) |
| *G06K 9/32* | (2006.01) |
| *G06K 9/68* | (2006.01) |
| *G06N 3/08* | (2006.01) |

(52) U.S. Cl.
CPC ....... *G06K 9/6257* (2013.01); *G06K 9/00422* (2013.01); *G06K 9/325* (2013.01); *G06K 9/344* (2013.01); *G06K 9/6807* (2013.01); *G06N 3/0454* (2013.01); *G06N 3/08* (2013.01); *G06K 2209/01* (2013.01)

(58) Field of Classification Search
None
See application file for complete search history.

(56) References Cited

U.S. PATENT DOCUMENTS

| | | |
|---|---|---|
| 5,542,006 A | 7/1996 | Shustorovich et al. |
| 9,501,724 B1 | 11/2016 | Yang et al. |
| 10,007,863 B1 | 6/2018 | Pereira et al. |

(Continued)

OTHER PUBLICATIONS

Wang, F. et al., "Convolutional recurrent neural networks with hidden Markov model bootstrap for scene text recognition," IET Computer Vision, The Institution of Engineering and Technology, vol. 11, No. 6; Sep. 1, 2017 (8 pages).

(Continued)

*Primary Examiner* — Soo Jin Park
(74) *Attorney, Agent, or Firm* — Troutman Sanders LLP; Christopher J. Forstner; John A. Morrissett

(57) ABSTRACT

A method of identifying and recognizing characters using a dual-stage neural network pipeline, the method including: receiving, by a computing device, image data; providing the image data to a first convolutional layer of a convolutional neural network (CNN); applying, using the CNN, pattern recognition to the image data to identify a region of the image data containing text; providing sub-image data comprising the identified region of the image data to a convolutional recurrent neural network (CRNN); and recognizing, using the CRNN, the characters within the sub-image data.

20 Claims, 9 Drawing Sheets

(56) References Cited

U.S. PATENT DOCUMENTS

| | | |
|---|---|---|
| 2005/0094897 A1 | 5/2005 | Zuniga |
| 2016/0232410 A1 | 8/2016 | Kelly et al. |
| 2017/0098138 A1 | 4/2017 | Wang et al. |
| 2018/0114084 A1 | 4/2018 | Meng et al. |
| 2018/0114115 A1 | 4/2018 | Liang et al. |
| 2018/0114317 A1 | 4/2018 | Song et al. |
| 2018/0239987 A1 | 8/2018 | Chen |

OTHER PUBLICATIONS

Extended European Search Report in related EP Application No. 19159265.8, dated Aug. 1, 2019.
Delakis, M. et al., "Text Detection with Convolutional Neural Networks," VISAPP 2008, 5 pages.
Li, H. et al., "Towards End-to-End Text Spoiling With Convolutional Recurrent Neural Networks," arXiv:1707.039851v1 [cs.CV] Jul. 13, 2017, 14 pages.
Shi, B. et al., "An End-to-End Trainable Neural Network for Image-Based Sequence Recognition and its Application to Scene Text Recognition," arXiv:1507.05717v1 [cs.CV] Jul. 21, 2015, 9 pages.
Li et al., "Reading car license plates using deep convolutional neural networks and LSTMs," In: arXiv:1601.05610, Jan. 21, 2016.
Bartz et al., "STN-OCR: a single neural network for text detection and text recognition," In. arXiv:1707.08831, Jul. 27, 2017.
Gao et al., "Reading scene text with attention convolutional sequence modeling," In: arXiv: 1709.04303, Sep. 13, 2017.

DUAL STAGE NEURAL NETWORK PIPELINE SYSTEMS AND METHODS

CROSS REFERENCE TO RELATED APPLICATION

This application is a continuation of U.S. patent application Ser. No. 15/904,964, filed Feb. 26, 2018, the entire contents of which is incorporated herein by reference.

FIELD OF INVENTION

The present disclosure relates to neural network systems and methods, and more particularly to dual-stage neural network pipelines for detecting and recognizing particular (e.g., specialized) characters.

BACKGROUND

Optical character recognition (OCR) has a variety of applications. Existing OCR approaches typically use a single tool for detecting and recognizing characters within images. However, in some applications, these single tool approaches are insufficient to identify, isolate, and recognize special characters within a document.

As an example, business checks and personal checks commonly have bank codes and accounting information (MICR line) printed thereon with magnetic ink characters. This information is necessary for settling a check payment. OCR is desirable to capture this information without requiring human input. Using existing OCR approaches, which presume that this information is printed on a lower portion of a check, an OCR tool is used to read all the text in a check image; then utilizing image processing, the lower portion of the image and the text read in that region is interpreted and assumed to be the MICR line. However, when the MICR line is not in its expected location in the lower portion of a check, existing OCR approaches may inaccurately read MICR line, thus requiring human input to read and correct the error or, if the error is not caught and the misread MICR line corresponds to a different account, an improperly paid check may result.

Accordingly, there is a need for systems and methods for providing improved detection and recognition of specialized information, such as MICR lines. Embodiments of the present disclosure are directed to this and other considerations.

SUMMARY

Disclosed embodiments provide systems and methods using dual-stage neural network pipelines for detecting and recognizing particular characters. In some cases, the particular characters may include, as non-limiting examples, MICR line characters, musical notes, and handwritten text.

Consistent with the disclosed embodiments, various methods and systems are disclosed. In an embodiment, a method for identifying and recognizing characters using a dual-stage neural network pipeline is disclosed. The method may be implemented with a computing device. The method may include receiving image data. The image data may be provided to a first convolutional layer of a convolutional neural network. Pattern recognition may be applied to the image using the convolutional neural network in order to identify a region of the image data containing text. Sub-image data including the identified region of the image data may be provided to a convolutional recurrent neural network. The characters may be recognized within the sub-image data using the convolutional recurrent neural network. The method may further include dividing the image data into a plurality of tiles. In some cases, the applying pattern recognition may include applying pattern recognition to the plurality of tiles to identify tiles of the plurality of tiles containing text, the identified region corresponding to the identified tiles. The sub-image data may be substantially limited to image data corresponding to the identified tiles. In some cases, the convolutional neural network may include the first convolutional layer, a second convolutional layer, first and second rectifier layers respectively following the first and second convolutional layer, and three fully-connected layers following the second rectifier layer. In some cases, the convolutional neural network may further include first and second pooling layers respectively following the first and second rectifier layers, the three fully-connected layers following the second pooling layer. The convolutional neural network may further include a sigmoid layer following the second pooling layer, and a dropout layer following the sigmoid layer, the three fully-connected layers following the dropout layer. In some implementations, the three fully-connected layers may include, respectively, at least 5000 neurons, 2000 neurons, and 1000 neurons. In some implementations, the three fully-connected layers may include, respectively, less than 10000 neurons, 5000 neurons, and 2000 neurons.

Consistent with the disclosed embodiments, systems and non-transitory computer readable mediums for providing dual-stage neural network pipelines for detecting and recognizing specialized characters.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
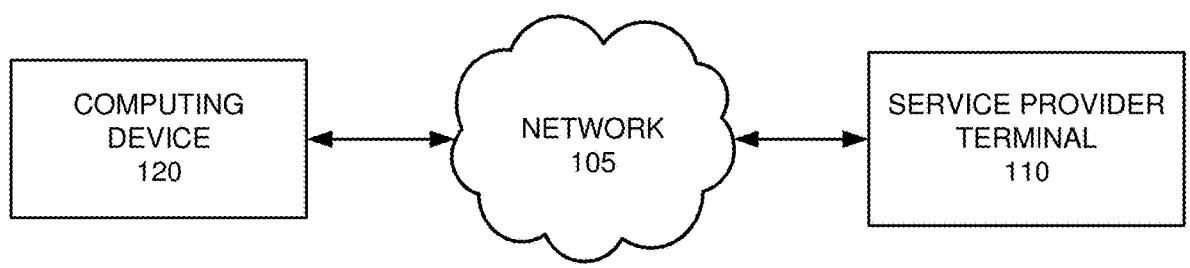
FIG. 1 is a diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present disclosure is directed to methods and systems for using a dual-stage neural network pipeline, and, in particular, for utilizing the dual-stage neural network pipeline to detect and recognize specialized characters (e.g., particular patterns, symbols, texts, fonts, etc.) In some embodiments, a method may include receiving an image of a document. The document may be split into a series of tiles, which may be of equal size. Each tile (or a subset/plurality of tiles) may be analyzed using a convolutional neural network (CNN) to determine if any portion of the tiles includes specialized characters. After the analysis, a convolutional recurrent neural network (CRNN) analyzes a portion of the image determined to include the specialized characters to perform optical character recognition. In some embodiments, the CNN is made up of neurons that have learnable weights and biases. The whole network expresses a single score (e.g., from raw image pixels it determines whether the tile includes a portion of the specialized characters). An advantage of CNN for this processing is that, in some cases, CNNs can interpret image data with relatively little preprocessing. In some cases, the CRNN includes convolutional layers, recurrent layers, and a transcription layer. The convolutional layers automatically extract a feature sequence (e.g. features of the specialized characters) from the identified portions. The recurrent layers predict a specialized character for each specialized character in the identified portion. The transcription layer translates the predictions of the recurrent layers into the entire specialized character sequence found in the identified portion. In some cases, the use of CRNN provides efficient text recognition of arbitrary length sequence recognition, while the combination with a CNN network increases efficiency and limits false identification of specialized characters and sequences.

In an embodiment, a method for identifying and recognizing characters using a dual-stage neural network pipeline is disclosed. The method may be implemented with a computing device. The method may include receiving image data. The image data may be provided to a first convolutional layer of a CNN. Pattern recognition may be applied to the image using the CNN to identify a region of the image data containing text (i.e., one or more of characters). Sub-image data including the identified region of the image data may be provided to a CRNN. The characters may be recognized within the sub-image data using the CRNN. The method may further include dividing the image data into a plurality of tiles. In some cases, the applying pattern recognition may include applying pattern recognition to the plurality of tiles to identify tiles of the plurality of tiles containing text, the identified region corresponding to the identified tiles. The sub-image data may be substantially limited to image data corresponding to the identified tiles. In some cases, the CNN may include the first convolutional layer, a second convolutional layer, first and second rectifier layers respectively following the first and second convolutional layer, and three fully-connected layers following the second rectifier layer. In some cases, the CNN may further include first and second pooling layers respectively following the first and second rectifier layers, the three fully-connected layers following the second pooling layer. The CNN may further include a sigmoid layer following the second pooling layer, and a dropout layer following the sigmoid layer, the three fully-connected layers following the dropout layer. In some implementations, the three fully-connected layers may include, respectively, at least 5000 neurons, 2000 neurons, and 1000 neurons. In some implementations, the three fully-connected layers may include, respectively, less than 10000 neurons, 5000 neurons, and 2000 neurons.

In another embodiment, there is a method of identifying and recognizing one or more specialized character sequences within a document. The method may include providing image data of an image of the document to a CNN. The convolutional network may be trained to recognize at least a portion of a specialized character sequence. The method may further include identifying, using the CNN, a region of the image data containing text including the one or more specialized character sequences. Region image data corresponding to the identified region may be provided to a CRNN. Optical character recognition may be performed, using the CRNN, to recognize characters within the one or more specialized character sequences within the identified region. The method may further include dividing the image data into a plurality of tiles. The identifying the region may include applying pattern recognition to each of the plurality of tiles to identify one or more special character-containing tiles out of the plurality of tiles. The method may further include dividing the image data into a plurality of overlapping tiles with each of the plurality of overlapping tiles being substantially a same size. Identifying the region may include applying pattern recognition to each of the plurality of tiles to identify one or more text-containing tiles out of the plurality of tiles. In some cases, the CNN may be configured to identify a portion of the one or more specialized character sequences based on a visual pattern of the one or more specialized character sequences. In some implementations, a length of the one or more specialized character sequences may be variable.

In another embodiment, there is a system for identifying and reading a magnetic ink character recognition (MICR) line. The system may include one or more processors and a memory in communication with the one or more processors and storing instructions. The instructions may be executed by the one or more processors. When executed, the instructions may cause the system to: receive image data of a document; provide the image data to a CNN, the CNN being trained to recognize MICR lines; identify, using the CNN, a region of the image data containing a MICR line; provide region image data corresponding to the identified region of the image data containing the MICR line to a CRNN; and recognize, using the CRNN, the characters within the region image data. In some implementations, the system may further include a camera, and the instructions may cause the system to control the camera to capture an image of the document, the image data of the document being provided to the CNN corresponding to the captured image. In some cases, the instructions may further cause the system to: extract the region image data corresponding to the identified region from the image data; and provide the extracted region image data to the CRNN. In some implementations, the CNN may have been trained to recognize an appearance of portions of MICR lines. In some embodiments, the instructions may further cause the system to divide the image data of the document into a plurality of similarly sized tiles; and identify two or more tiles of the plurality of tiles containing a portion of the MICR line. In some embodiments, the instructions may further cause the system to identify the region of the image data containing the MICR line by comparing positioning of the two or more tiles within the image data. In some embodiments, the instructions may further cause the system to divide the image data of the document into a plurality of overlapping tiles; identify tiles of the plurality of tiles containing a portion of the MICR line; and identify the region of the image data containing the MICR line based on comparing positioning of the two or more tiles within the image data, and restricting portions of the image data from corresponding to a single identified tile.

In another embodiment, a system may include one or more memory devices storing instructions, and one or more processors configured to execute the instructions to perform steps of a method of providing a real-time purchase as disclosed herein.

In another embodiment, a non-transitory computer-readable medium is disclosed. The non-transitory computer-readable medium may store instructions that, when executed by one or more processors, cause a system to execute a method of providing a text detection and recognition using a dual-stage neural network pipeline as disclosed herein.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, dual-stage neural network pipeline system 100 may include a service provider terminal 110 in communication with a computing device 120 via network 105. In some embodiments, service provider terminal 110 may also be in communication with various databases (e.g., banking databases). Computing device 120 may be a mobile computing device (e.g., a smart phone, tablet computer, smart wearable device, portable laptop computer, voice command device, wearable augmented reality device, or other mobile computing device) or a stationary device (e.g., desktop computer or automatic teller machine (ATM)).

In some embodiments, the computing device 120 may transmit an image of a document to the service provider terminal 110, and the service provider terminal 110 may utilize a dual-stage neural network pipeline to identify and recognize specialized text within the document. In some embodiments, the server provider terminal 110 may control the computing device 120 to implement one or more aspects of the dual-stage neural network pipeline. In some cases, the computing device 120 may perform pre-processing on the image before sending pre-processed image data to the service provider terminal 110.

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
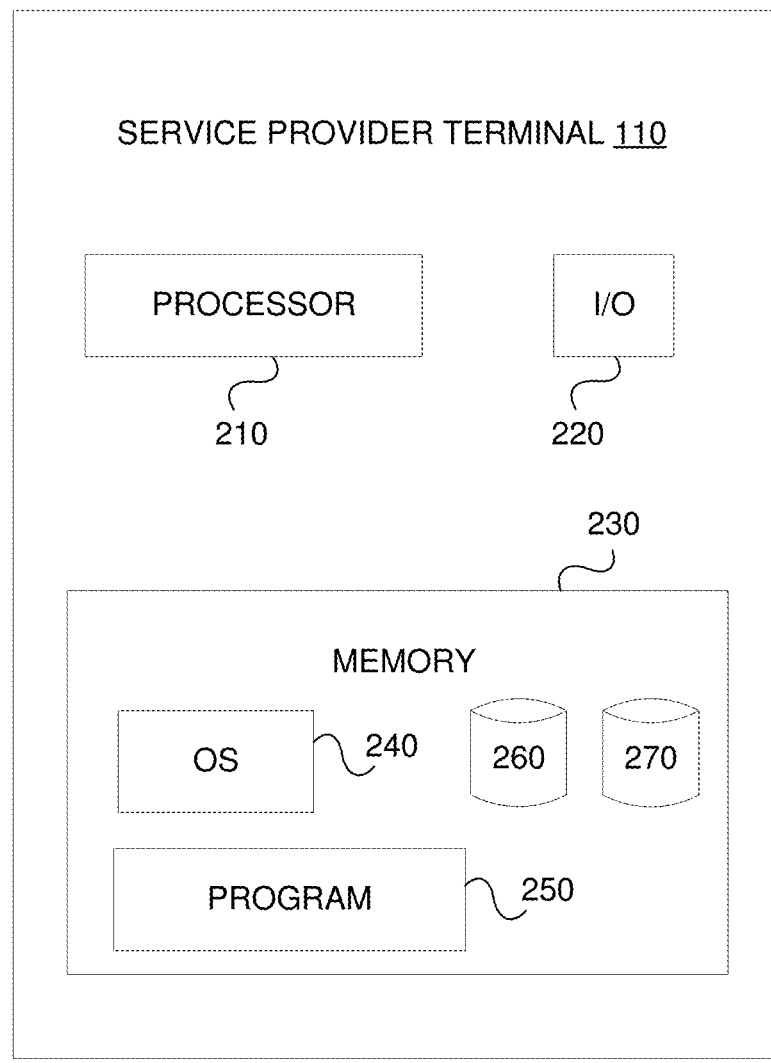
FIG. 2 is a component diagram of a service provider terminal according to an example embodiment.

An example embodiment of service provider terminal 110 is shown in more detail in FIG. 2. Computing device 120 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, service provider terminal 110 may further include a peripheral interface, a transceiver, a mobile network interface in communication with processor 210, a bus configured to facilitate communication between the various components of the service provider terminal 110, and a power source configured to power one or more components of service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider terminal 110 may configured to remotely communicate with one or more other devices, such as computer device 120. According to some embodiments, service provider terminal 110 may utilize a dual-stage neural network pipeline to detect and recognize textual information.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from service provider terminal 110. For example, service provider terminal 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable service provider terminal 110 to perform one or more of the processes and functionalities associated with the disclosed embodiments.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may include one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via computing device 120).

In example embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Figure 3:
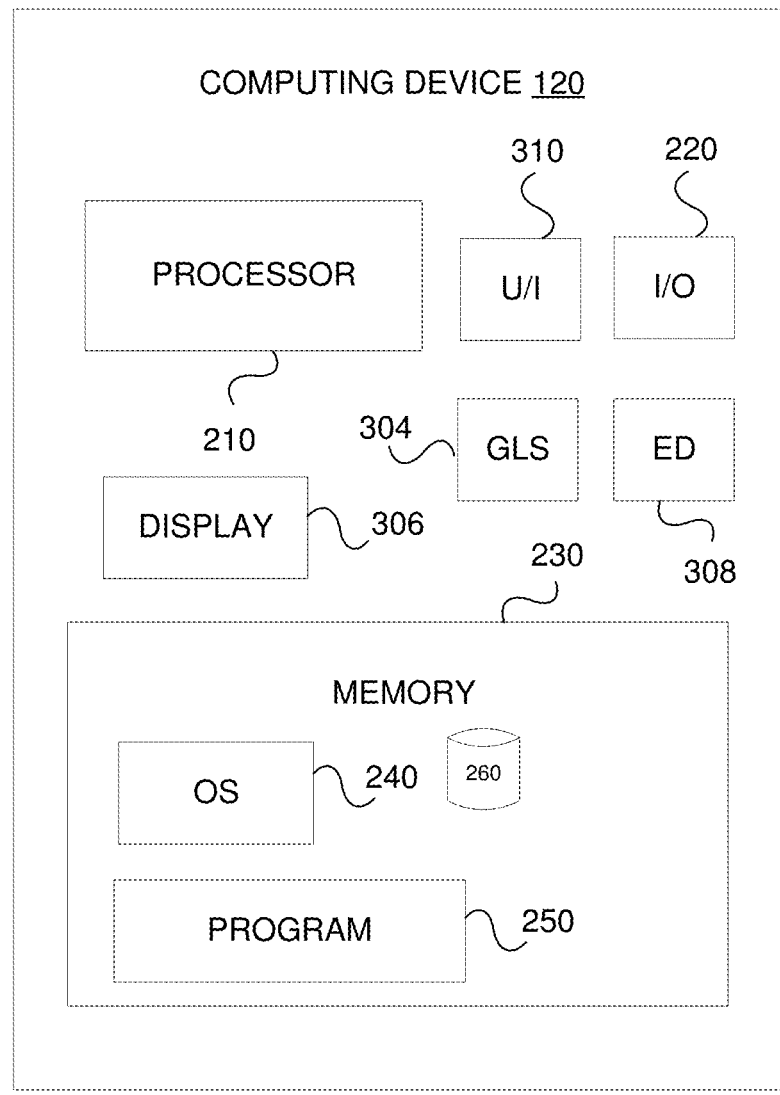
FIG. 3 is a component diagram of a computing device according to an example embodiment.

FIG. 3 shows an example embodiment of computing device 120. As shown, computing device 120 may include input/output ("I/O") device 220 for receiving data from another device (e.g., service provider terminal 110), memory 230 containing operating system ("OS") 240, program 250, and any other associated component as described above with respect to service provider terminal 110. Computing device 120 may also have one or more processors 210, a geographic location sensor ("GLS") 304 for determining the geographic location of computing device 120, a display 306 for displaying content such as text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

Figure 4:
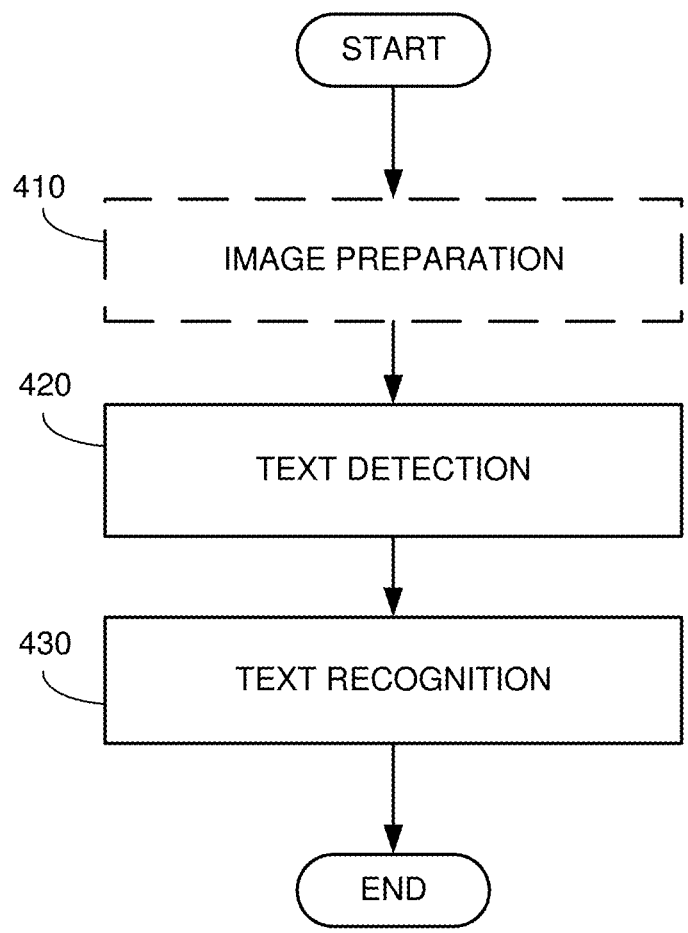
FIG. 4 is a flowchart of a method for providing a dual-stage character recognition according to an example embodiment.

FIG. 4 shows a flowchart of a method 400 for providing a dual-stage neural network character recognition. Method 400 may be performed by some or all of service provider terminal 110 and computing device 120.

In block 410, an image is prepared. According to some embodiments, the computing device 120 prepares the image. In some cases, the computing device 120 may prepare the image in accordance with instructions received from the service provider terminal 110. In some cases, the service provider terminal 110 receives an image and pre-processes the image. Some implementations may omit image preparation (block 410). In such cases, the image may be prepared before being received, or text detection may be performed on an un-prepared image. An example implementation of preparing an image (block 410) is described below with reference to FIG. 5.

In block 420, text is detected within the image. The text detection may be performed using a convolutional neural network (CNN). Pattern recognition may be performed on the image using the CNN. According to some embodiments, the computing device 120 performs text detection on the image. In some cases, the service provider terminal 110 performs the text detection. An example implementation of text detection (block 420) is described below with reference to FIG. 6.

In block 430, text within the image is recognized. The CNN may determine a region within the image containing text. This region may be analyzed using a convolutional recurrent neural network (CRNN) to perform optical character recognition. In some cases, the service provider terminal 110 performs the text recognition. An example implementation of text recognition (block 430) is described below with reference to FIG. 7. In some cases, the text may be various forms of specialized characters. As non-limiting examples, the text may include MICR line characters, handwritten text, or musical notes.

Figure 5:
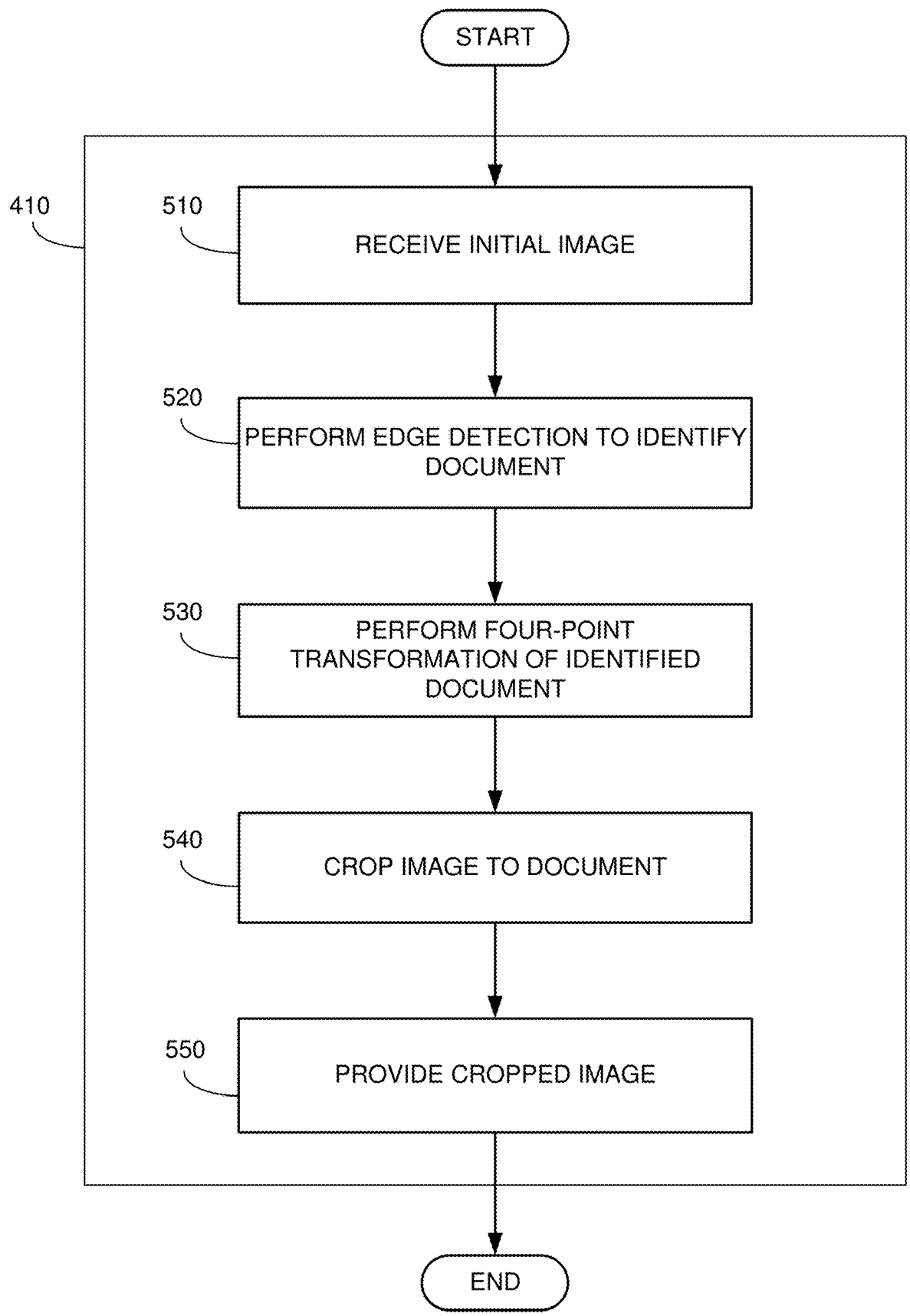
FIG. 5 is a flowchart of image preparation according to an example embodiment.

FIG. 5 shows a flowchart of image preparation 410 according to an example embodiment. Image preparation 410 may be performed by some or all of service provider terminal 110 and computing device 120.

In block 510, system 100 (e.g., via service provider terminal 110) may receive an initial image containing a document. In some cases, the system 100, may include a camera, and the system 100 may capture an image of a document. In some cases, the service provider terminal 110 may receive image data of the initial image over the network 105. The initial image data may be encrypted. In some embodiments, the system 100 may capture an image substantially limited to the document. In some cases, edges of a document may be detected within a sensing field and the captured image may be substantially limited to the document. In some embodiments, an application executing on the system 100 may include user input option for defining a boundary of the document within an image or an image field.

In block 520, system 100 (e.g., via service provider terminal 110) may perform edge detection to determine edges of the document within the image. The edge detection may be used to identify the document within the image. The edge detection may be used to save processing power when performing the text detection 420 and text recognition 430.

In block 530, system 100 (e.g., via service provider terminal 110) may transform the image. For example, the document may be rotated or otherwise warped within the initial image. The system 100 may perform four-point transformation of the document within the image. The transformation of the document may help standardize the document for text detection 420 and/or text recognition 430.

In block 540, system 100 (e.g., via service provider terminal 110) may crop the transformed image to include only the document or substantially the document. The cropping may reduce an amount of image data that must be transmitted (saving bandwidth) and processed via the text detection 420 and text recognition 430 (saving processing power). In some embodiments, an initial image of the document may be captured in a way such that only the document (or substantially only the document) is captured for processing. In this embodiment, the captured image is a cropped image and thus it may not be advantageous to further crop the image.

In block 550, system 100 (e.g., via service provider terminal 110) provides the cropped image for text detection 420. For example, the computing device 120 may transmit the cropped image to the service provider terminal 110 via the network 105 for text detection 420.

Figure 6:
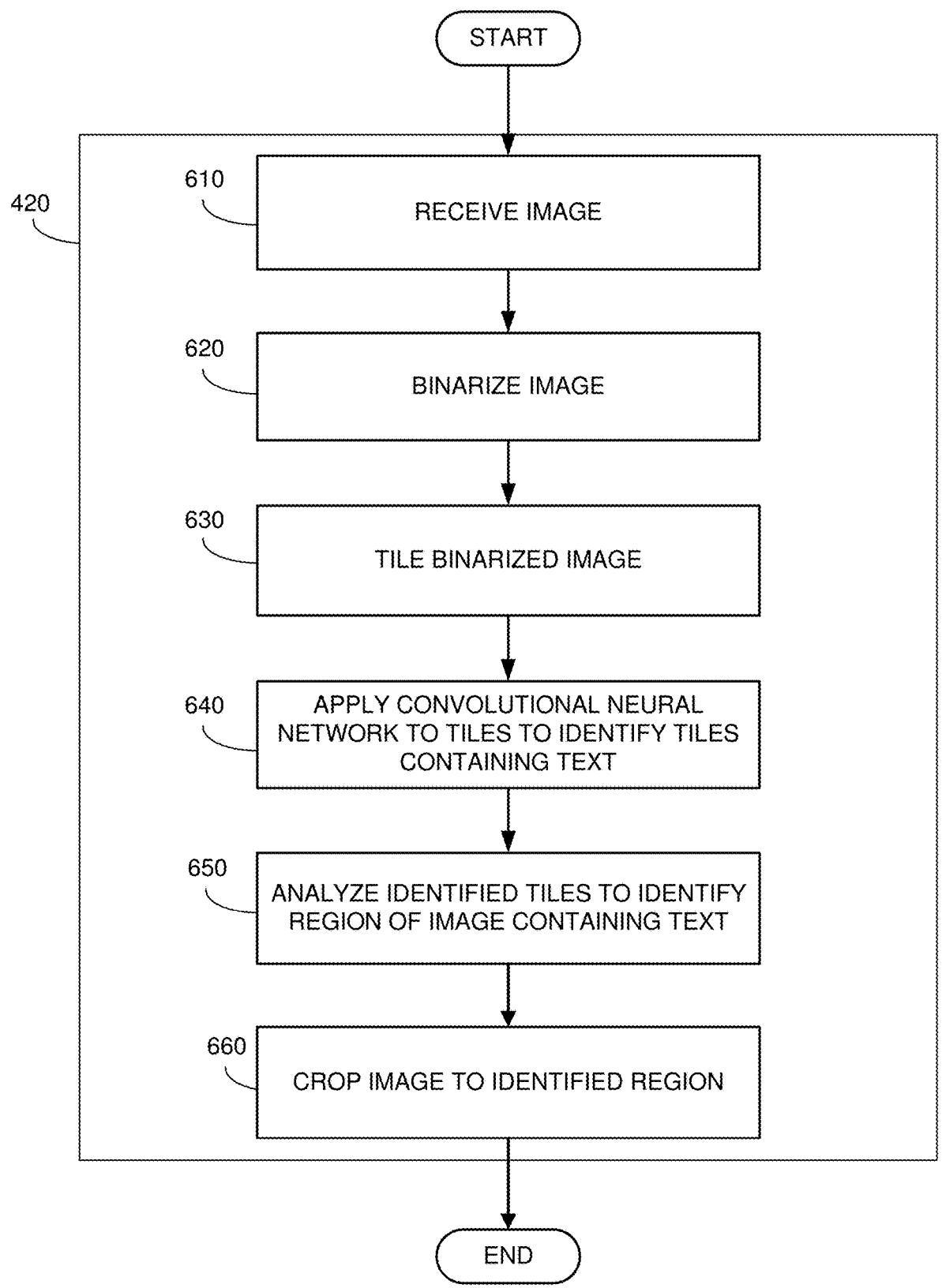
FIG. 6 is a flowchart of text detection according to an example embodiment.

FIG. 6 shows a flowchart of text detection 420 according to an example embodiment. Text detection 420 may be performed by some or all of service provider terminal 110 and computing device 120.

In block 610, system 100 (e.g., via service provider terminal 110) may receive an image (e.g., cropped image data from block 550). According to some embodiments, the image may be received pre-processed. For example, the service provider terminal 110 may receive a prepared image from the computing device 120. The image may be an image of a document.

In block 620, system 100 (e.g., via service provider terminal 110) may binarize the image. For example, the system 100 may form a binarized copy of the image in memory or as a new image file. In some cases, the system 100 may convert the image into a black and white image. If the image is received compressed, the system 100 may decompress the image. The binarized image may consist essentially of a series of pixel values corresponding to positions within the image. The use of a binarized image provides a computationally more efficient detection of portions of the image containing portions of text (e.g., specialized characters).

In block 630, system 100 (e.g., via service provider terminal 110) may create a plurality of tiles of the binarized image. The tiles may be substantially a same size. For example, in some cases, each tile is a same pixel dimension. In some implementations, the tiles may be approximately 400 pixels long by 48 pixels high. The pixel dimensions of the tiles may remain constant regardless of a size or scale of the image. In some embodiments, the same-sized tiles may overlap to form a plurality of overlapping tiles. There are several ways to create the tiles including, for example, copying portions of the binarized image or logically (e.g., by recognizing different portions of the single image as corresponding to different tiles). As a non-limiting example, consider an image as a 1200 by 144 matrix of pixel values. In the case tiles being 400 pixels long by 48 pixels high, a 400 px by 48 px "window" may be applied to the matrix every 50 pixels in length and 12 pixels in height. Thus, tiles would begin with vertices at, for example, (0,0), (0,50), (0, 100) . . . (12, 0), (12, 50) . . . (132, 0) . . . (132, 1150).

In block 640, system 100 (e.g., via service provider terminal 110) may apply the CNN to each of the tiles (or a portion or subset of the tiles) to identify tiles containing text information. In some embodiments, one or more tiles may be discarded before further analysis based on the data contained in the tile. For example, if it is determined (e.g., based on the binarized data of the tie) that the tile is practically all white or practically all black, these tiles may not be further analyzed and thus the processing requirements may be reduced. The CNN may be trained to recognize a visual pattern of text (e.g., a look of portions of specialized characters). The CNN may include one or more of convolutional layers, rectifier layers, pooling layers, sigmoid layers, dropout layers, and fully-connected layers. A more detailed description of an example CNN is provided below with reference to FIG. 8. In some embodiments, because the entire image is tiled and all tiles may be analyzed, the text may be recognized wherever it appears in the image. For example, in the case of a MICR line, instead of presuming the MICR is on a bottom of the check, the present system would detect the MICR line on a top or side of the check. In some embodiments, it may be advantageous to tile and analyze only a portion of the image data that may be expected to include the characters of interest. The portion of the image data may be determined based on a format of a document captured in the image, for example.

Although blocks 620 through 640 discuss the use of binarized image data, this is merely an example. In some implementations, the use of additional image data may provide enhanced detection of text within portions of an image. For example, greyscale image data may be used, which may provide significant efficiency gains over the use of color image data, while having some improved detection over the use of greyscale images.

In block 650, system 100 (e.g., via service provider terminal 110) may identify a region of the image containing text. For example, service provider terminal 110 may analyze the results of the CNN application of the analyzed tiles to determine a region containing text. In some embodiments, the region may correspond to a region of the image where tiles were identified as containing text. The region may be identified based on the results of overlapping tiles (e.g., the region will exclude an area of the image that does not have overlapping text detection). In other embodiments, the region may span between groups of tiles that are identified as containing text. Various rules may be applied to the results of the CNN analysis to determine the desired region. For example, the region may be identified based on a proportion or concentration of positive tile results (i.e., tiles identified as containing a portion of text). The region may also be identified based on one or more rules regarding likely or allowed locations of the characters of interest and other rules pertaining to a particular format or boundary of the document captured in the image data or based on particular characteristics of the specialized characters.

In some implementations, the analysis of tiles results in a two dimensional-matrix of 0 and 1 values. In some cases, the rows, or portions of rows, can be added up, and a certain number of "hits" in each row indicates that the CNN detected portions of the text (e.g., the MICR line). In the case of a check image, most rows will have 0 or a few "hits", as of a most of a check image does not have any part of the MICR line. Rows with non-zero values are observed to determine whether they occur consecutively, or on their own. Based on that, a threshold can be applied on how many "hits" needed before considering the results valid. This threshold can help to filter out false positive tile results. Continuing to do this across all rows, there may be multiple locations that are found to legitimately contain the MICR lines. In these cases, the larger (region wise) detected location can be assumed to be the legitimate MICR line. However, this is merely an example and alternative approaches may be used.

Once a legitimate region of the text is determined, the system 100 may determine where and how to crop out this region of the image based on their locations in the matrix. Skew may be minimized by rotating the image based on the offset between hits of each row. For example, if a photo of a check is taken and the MICR line is not level, the matrix results will show hits on multiple consecutive rows, where the "hits" within each row are offset by a little for each row, depending on how skewed the image is. However, if the MICR line is completely level, this offset would not be present or would be minimal, and, in some cases, every row would have hits on the same columns. Thus, the matrix of results may be used to determine if the image is skewed, and how much the image is skewed. The image may be cropped by extrapolating the actual pixel location in the image from the matrix of results. In some cases, all of the matrix processing is done in memory, so the binarize image is merely a binarized representation of the received image, and the image file itself is not modified at least until skew correction and cropping occurs. In some implementations, the region determination, skew correction, and cropping may be done with code-based analysis of the CNN tile results, and without the use of a neural network.

In block 660, system 100 (e.g., via service provider terminal 110) may generate a new image including a crop of the image to the identified region or select only those portions of the original image data corresponding to the identified region for further processing. According to some embodiments, the cropping may involve forming a new image from the original image data corresponding only to the identified region. In some cases, the new image may be converted to a greyscale image. Thus, in some embodiments, the text detection 420 may utilize binarized image data to analyze an entire image and the text recognition 430 may use greyscale or color image data to determine the content of the recognized text. Accordingly, the use of two neural networks enables improved text recognition (e.g., using greyscale image data instead of binarized image data) while being able to analyze an entire image efficiently (e.g., using binarized image data in the image detection 420). In other embodiments, the cropping may include applying a convolution recurrent neural network 430 to only a portion of the binarized image corresponding to the identified region.

In some embodiments, the text detection 420 may include skew correction. For example, the image data corresponding to the region may be rotated, stretched, or otherwise modified to be prepared for text recognition 430. As an example, personal checks are commonly folded and subjected to physical stresses (e.g., placed in a wallet). This can result in images of the checks being distorted by creases, crumpled portions, tears, et cetera. Accordingly, in some cases, the image data of the region may be manipulated to create straight and more uniform MICR lines within the identified region. In some implementations, it may be advantageous to not change the image data at all except for some skew correction. In some cases, rotating the image does not change the underlying data, but merely uniformly relocates the data to a different location. In some implementations, the CNN may be trained to identify and/or correct skew in the text (e.g., in a MICR line). In some implementations, a combination of neural networks and code-based (e.g., programmed) approaches may be used to identify and correct skew.

Figure 7:
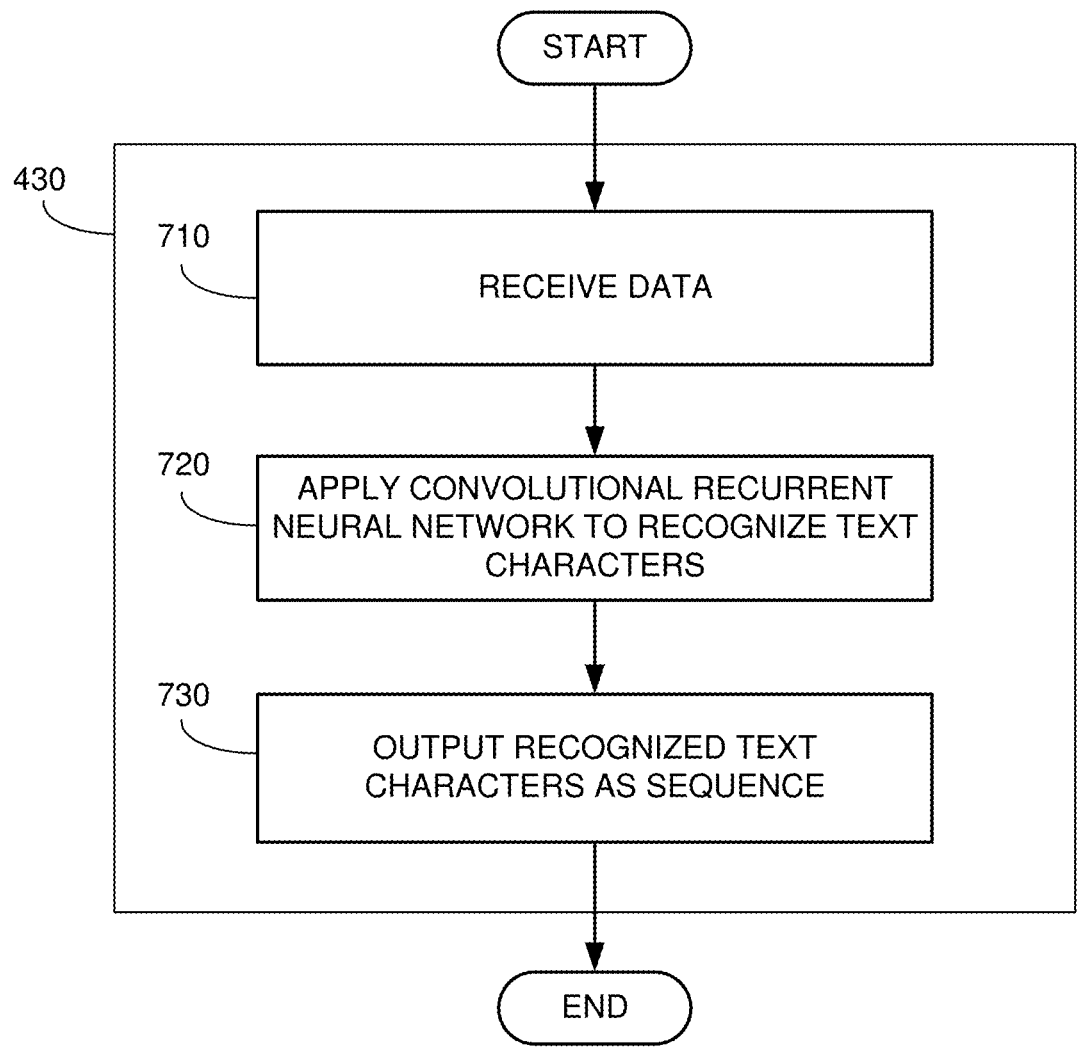
FIG. 7 is a flowchart of text recognition according to an example embodiment.

FIG. 7 shows a flowchart of text recognition 430 according to an example embodiment. Text recognition 430 may be performed by some or all of service provider terminal 110 and computing device 120.

In block 710, system 100 (e.g., via service provider terminal 110) may receive data (e.g., image data). According to some embodiments, the data may be image data corresponding to a region of an image in which text was detected. In some cases, the data may be a newly formed image formed from the region of the image in which text was detected. The data may be colored or greyscale image data (for example, instead of binarized image data utilized for text detection 420). In some cases, the newly formed image may be a greyscale image or converted to greyscale.

In block 720, system 100 (e.g., via service provider terminal 110) may apply the CRNN to the received data to recognize text characters. In some implementation, the CRNN includes three primary components, convolutional layers, recurrent layers, and a transcription layer. The convolutional layers may automatically extract feature sequences from each input image (e.g., from each set of image data received). For example, the convolutional layers may create a plurality of feature maps of the image data. The convolutional layers combine the feature maps, and extract feature sequences (e.g., feature sequences) for a plurality of regions of the image data. The recurrent layers may embody a bidirectional Recurrent Neural Network (RNN). The RNN can use contextual cues among the feature sequences to label each sequence (i.e., predicting which if any character(s) are found for a given feature sequence). In some cases, the CRNN may not include one or more distinct recurrent layers, but may instead utilize alternative means to feed results from a part of the CRNN into another part of the CRNN. Once all feature sequences are labeled, the transcription layer combines the results for each feature sequence, and analyzes the results to accurately transcribe the sequence of text characters in the image data. Through the combination of layers, the CRNN can accurately process images having variable lengths of text (e.g., MICR lines).

As a non-limiting example, the convolutional portion of the CRNN may include seven convolutional layers. The output of the first, second, fourth, and sixth convolutional layers may feed into respective first through fourth pooling layers. In some cases, the first and second pooling layers may utilize 2×2 sized regions and have a step size of 2×2. The third and fourth pooling layers may utilize 2×2 sized regions and have a step size of 2×1 with 1×1 zero-padding. Through experimentation, it was discovered that the CRNN could be further enhanced by adding a first dropout layer after the third pooling layer and a second dropout later after the fourth pooling layer. In some cases, the first dropout layer may be a 30% dropout layer, while the second dropout layer may be a 50% dropout layer. In some embodiments, the layers may be laid out serially such that the first convolutional layer feeds into the first pooling layer, which feeds into the second convolutional layer, which feeds into subsequent layers until the second dropout layer feeds into the seventh convolutional layer.

In block 730, system 100 (e.g., via service provider terminal 110) outputs the recognized text characters as a sequence. For example, if the text is a MICR line, the characters may be ordered and sent to a financial server to process a check transaction.

Figure 8:
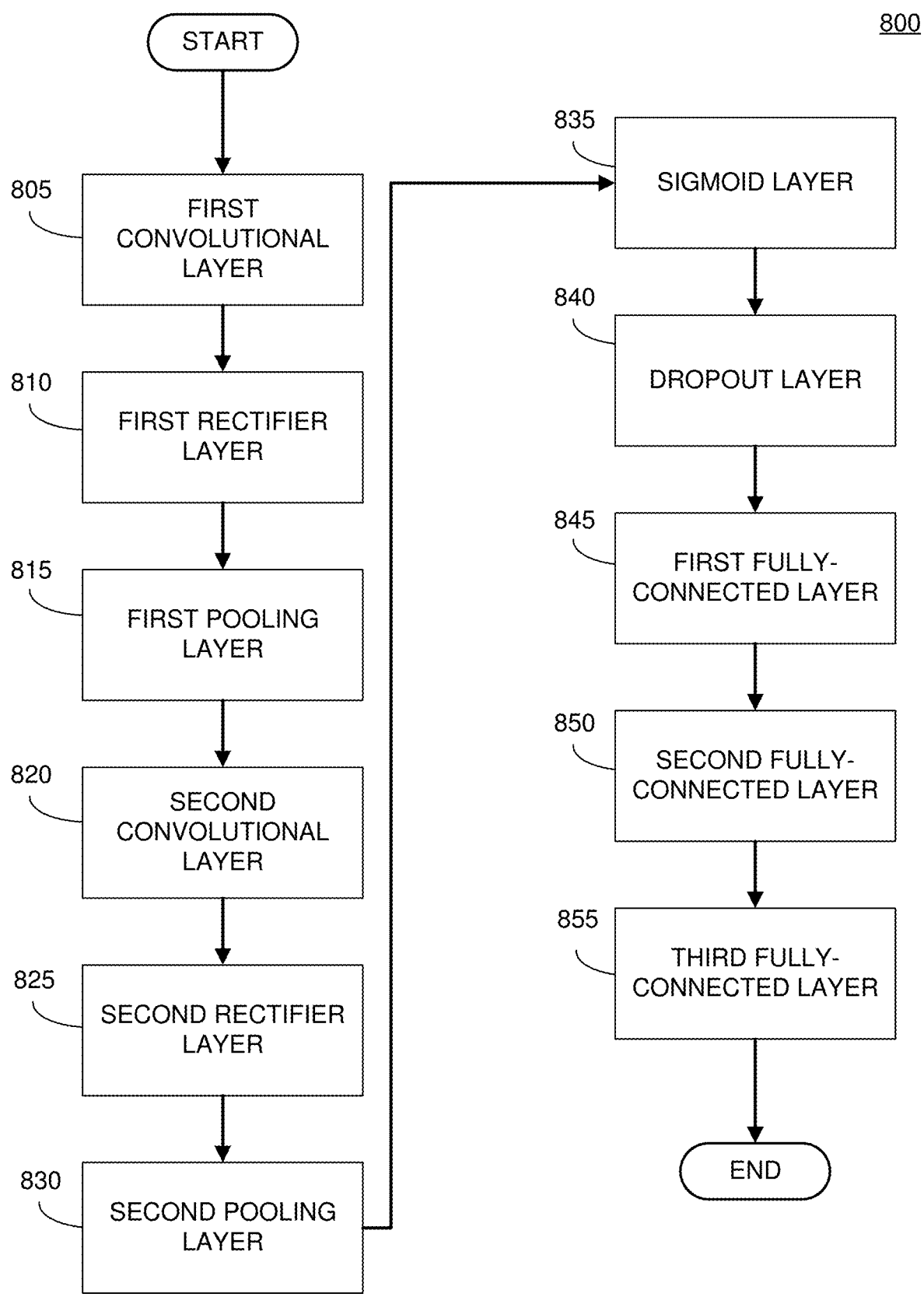
FIG. 8 is a flow-diagram of an example convolutional neural network.

FIG. 8 is a flow-diagram of a convolutional neural network (CNN) 800 according to an example embodiment. The flow-diagram illustrates the layers to which a tile of image data may be applied to determine if the tile contains a portion of text. The CNN 800 is specialized to perform pattern recognition on the tile. In other words, the CNN 800 determines whether a supplied tile includes a portion that matches a visual pattern of a MICR line or a portion thereof.

In the CNN 800, an image tile is initially provided to a first convolutional layer 805. The convolutional layer 805 is followed by a first rectifier layer 810, and then a first pooling layer 815. The first pooling layer 815 supplies its results to the second convolutional layer 820, which is likewise followed by a second rectifier layer 825 and a second pooling layer 830. The second pooling layer 830 supplies its results to a sigmoid layer 835, which then flows into a dropout layer 840. The results from the dropout layer 840 are provided to three fully-connected layers (845, 850, 855).

The first and second convolutional layers 805, 820 include a set of learnable filters. As the CNN 800 is trained, the filters adapt to detect visual features within a given tile that correspond to the training images (e.g., images including portions of text, specialized characters, or MICR lines). The result of each convolution layer 805, 820 may generate a plurality of feature maps (e.g., stacked feature maps corresponding to positioning within the image data). The first and second rectifier layers 810, 825 apply a function to the results of the respective convolutional layer 805, 820. For example, the first and second rectifier layers 810, 825 may apply a function to the results to eliminate negative numbers in the results. In some implementations, the rectifier layer 810, 825 may apply a simple maximum function (e.g., max(x,0)) to the results of the corresponding convolutional layer 805, 820 such that all results less than zero are set to zero. The first and second pooling layers 815, 830 are applied to generalize the output of the rectifying layers 810, 825. For example, the pooling layers 815, 830 may perform downsampling along a spatial dimension of the output of the rectifying layers 810, 825.

As a non-limiting example, if the image data has a size of 1000 px by 100 px, and the first convolutional layer 805 identifies 7 features for each pixel, the output of the first convolutional layer may be viewed as a 1000×100×7 block of feature maps. the first rectifier layer 810 may set any negative value in the 1000×100×7 block of feature maps to 0, creating a 1000×100×7 block of rectified feature maps. The first pooling layer 815 may downsample the 1000× 100×7 rectified feature map into a 700×70×2 block of downsampled feature maps. If the second convolutional layer 820 creates 2 features for each element in the downsampled feature map, the output of the second convolutional layer 820 may be a 700×70×4 block of feature maps. The second rectifier layer 825 may perform similar functionality as the first rectifier layer 810 to create a the 700×70×4 block of rectified feature maps. The second pooling layer 830 may then downsample the 700×70×4 block of rectified feature maps to a 500×50 block to be provided to the second pooling layer.

The results from the second pooling layer 830 are supplied to the sigmoid layer 835. The sigmoid layer 835 applies a sigmoid function to the results (e.g., resulting in a value between 0 and 1). These results are then provided to the dropout layer 840, which helps prevent the CNN 800 from over-fitting the tiles. In other words, the dropout layer 840 helps the CNN 800 learn what tiles containing the text (e.g. portion of a MICR line) look like generally without becoming overly tied to specific training samples.

The results from the dropout layer 840 are provided to three fully-connected layers (845, 850, 855). Each fully-connected layer 845, 850, 855 may have a plurality of neurons having full connections to all activations in the previous layer. The number of neurons used in each fully-connected layer 845, 850, 855 may be descending (i.e., the first fully-connected layer 845 has the most neurons, and the third fully-connected layer 855 has the least neurons). Selection of number of neurons and number of layers is an important aspect for reliability of the CNN 800. For example, with too many neurons, the CNN 800 may become overly-tuned to the training samples and less adaptable. Accordingly, in some implementations, the first through third fully-connected layers 845, 850, 855 may have at least 5000 neurons, 2000 neurons, and 1000 neurons, respectively. Meanwhile, too few neurons may result in a CNN 800 that is unpredictable or prone to false positives or negatives. Accordingly, in some implementations, the first through third fully-connected layers 845, 850, 855 may have less than 10000 neurons, 5000 neurons, and 2000 neurons, respectively. In some embodiments, the first through third fully-connected layers 845, 850, 855 may have about 6400 neurons, 3600 neurons, and 1600 neurons, respectively, for classification. After the third fully connected layer 855, the CNN 800 outputs a single result indicating whether the image data includes a portion of text (e.g., specialized characters or MICR lines).

In some cases, CNN 800 may be size agnostic. In other words, because the CNN 800 looks at tiles, it can detect whether any portion of a tile contains a portion of a specialized character (e.g., a portion of a MICR line), without requiring image processing on the entire image. This approach increases accuracy while limiting processor requirements.

Figure 9:
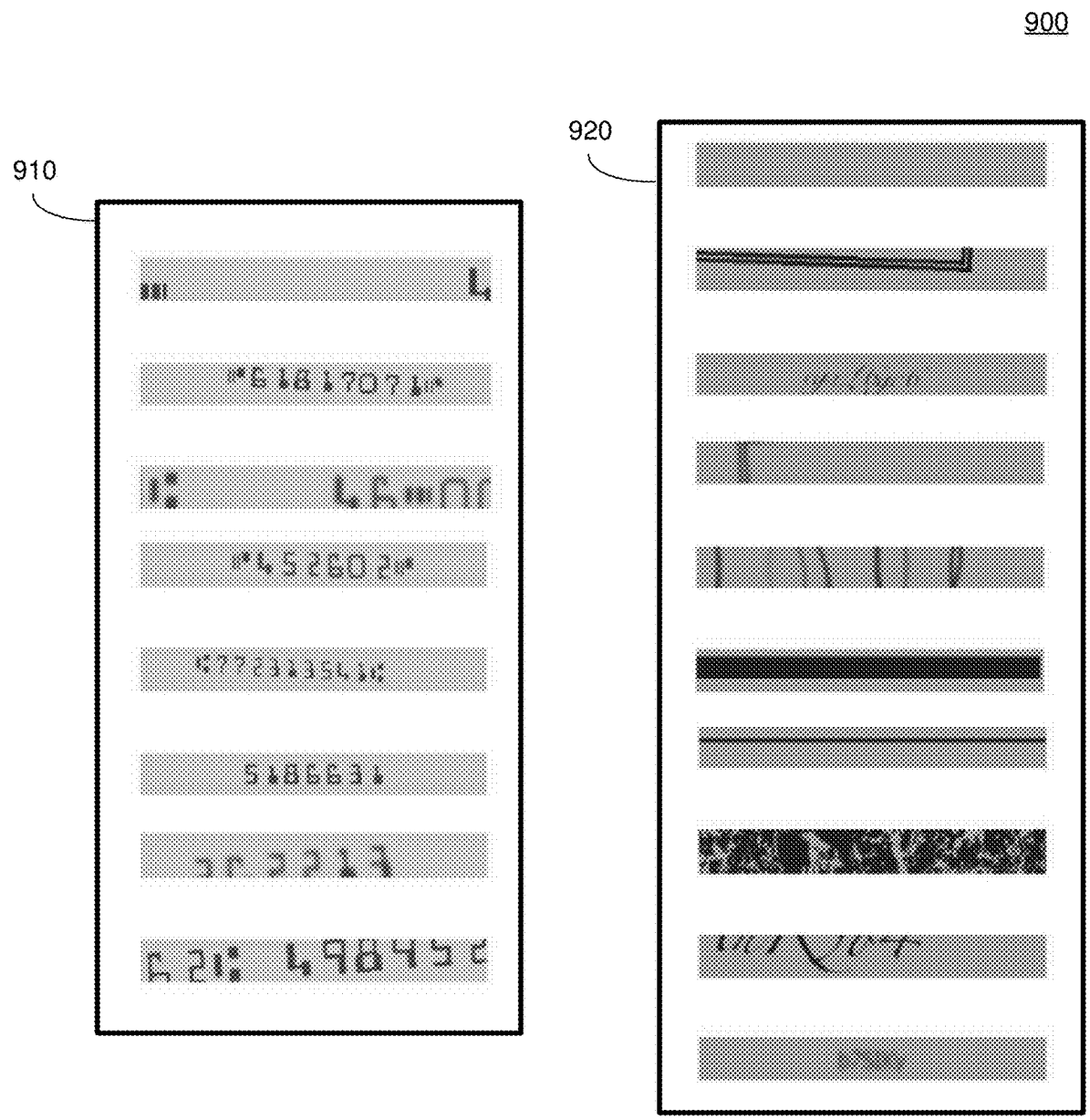
FIG. 9 illustrates example training samples for a convolutional neural network according to an example embodiment.

In some cases, the CNN 800 may be trained to recognize specialized characters (e.g., a MICR line on a check). The training samples may be substantially a same size as the tiles and (positive samples) may include various portions of MICR lines. FIG. 9 illustrates example training samples 900 for MICR lines. The training samples 900 include positive samples 910 (i.e., training samples containing a portion of a MICR line) and negative samples 920 (i.e., training samples that did not contain a portion of a MICR line). As can be seen, the training samples 900 all have a same size (e.g., pixel dimensions). However, the scale, angle, blurriness, and MICR completeness varies between the training samples 900. Accordingly, CNN 800 may be configured to detect MICR lines within tiles of varying scale, angles, blurriness, focus, and completeness.

In some cases, the CNN 800 may be trained on generated images. For example, the CNN 800 may be trained on generated images of portions of a MICR line. In some cases, the CNN 800 may be trained on real images of MICR lines or portions thereof. A set of training images may include a variety of potential real-world examples that may be encountered by system 100 and may be designed to include both positive samples and negative samples including a variety of challenges. In some cases, for example, the negative samples may include a number of a different font options, some of printed/typed text, and others are of handwritten text. Some implementations may realize improved accuracy by using a higher proportion of positive training samples than negative samples. In some implementations, for example, the use of approximately 60% of positive training samples and approximately 40% of negative samples may be effective.

Certain implementations provide the advantage of isolating text to be recognized. In other words, as opposed to processing all text within an image, certain implementations only perform the processor intensive process of character recognition to the portion of the image that contains the detected text. Further, this eliminates the need for use of image processing, region detection, or user interaction to determine which portion of the text data is relevant. According to certain implementations, the dual-stage neural network pipeline may be utilized to detect and recognize, as non-limiting examples, a MICR line, handwriting, or musical notes.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a typical use of the dual-stage neural network pipeline. It is intended solely for explanatory purposes and not in limitation. In one case, a user activates a bank application and takes a picture of a check using a smart phone (e.g., computing device 120). The smart phone may perform image processing on the picture. For example, the smart phone (e.g., executing the bank application) may perform one or more of edge detection (block 520), image transformation (block 530), and image cropping (block 540). The smart phone transmits (block 550) the check image to a bank server using a secure connection established by the bank application. The bank server (e.g., service provider terminal 110) receives the check image from the smart phone and begins text detection to detect a MICR line on the check. The bank server binarizes the check image (block 620) and applies a CNN to tiles of the check image (block 640). The CNN is trained to identify tiles that contain portions of a MICR line. Once all (or a subset/plurality of) tiles of the check image are analyzed with the CNN, the bank server processes the results to identify a region of the check image that contains the MICR line (650). The bank server may isolate a region(s) of the image including the MICR line (block 660) and process this region in preparation for text recognition. The bank server applies a CRNN to the isolated MICR line to identify the specialized characters in the MICR line. The bank server analyzes the recognized characters to recognize the MICR line sequence. Using the MICR line sequence, the bank server proceeds with processing the check for the user.

What is claimed is:

1. A method of identifying and recognizing characters using a dual-stage neural network pipeline, the method comprising:
   dividing image data into a plurality of tiles;
   applying, using a convolutional neural network (CNN), pattern recognition to the plurality of tiles to identify tiles of the plurality of tiles containing text;
   detecting an offset among the identified tiles;
   rotating the identified tiles based on the detected offset; and
   recognizing, using a convolutional recurrent neural network (CRNN), the characters within the rotated identified tiles of the image data.

2. The method of claim 1, wherein the CNN comprises:
   three fully-connected layers respectively comprise at least 5000 neurons, 2000 neurons, and 1000 neurons, and
   the three fully-connected layers respectively comprise less than 10000 neurons, 5000 neurons, and 2000 neurons.

3. The method of claim 1, wherein the image data is substantially limited to the identified tiles.

4. The method of claim 1, wherein the image data comprises an image of a document that is creased, crumpled, or torn.

5. A method of identifying and recognizing one or more specialized character sequences within a document, the method comprising:
   dividing image data of an image of the document into a plurality of tiles;
   identifying, using a convolutional neural network (CNN) trained to recognize at least a portion of a specialized character sequence, one or more tiles of the plurality of tiles containing text including the one or more specialized character sequences;
   detecting an offset among the one or more identified tiles; and
   rotating the one or more identified tiles based on the detected offset; and
   performing, using a convolutional recurrent neural network (CRNN), optical character recognition to recognize characters within the one or more specialized character sequences within the one or more rotated identified tiles.

6. The method of claim 5, wherein the CNN is configured to identify a portion of the one or more specialized character sequences based on a visual pattern of the one or more specialized character sequences.

7. The method of claim 5, wherein identifying the one or more tiles comprises applying pattern recognition to each of the plurality of tiles to identify one or more special character-containing tiles out of the plurality of tiles.

8. The method of claim 5, wherein a number of characters of the one or more specialized character sequences is variable.

9. The method of claim 5, wherein the CNN is trained to recognize at least the portion of a specialized character sequence using over fifty-percent positive training samples.

10. The method of claim 9, wherein the CNN is trained to recognize at least the portion of the specialized character sequence using approximately sixty-percent positive training samples and forty-percent negative training samples.

11. The method of claim 5, wherein the document is creased, crumpled, or torn.

12. A system for identifying and reading a magnetic ink character recognition (MICR) line, the system comprising:
   one or more processors; and
   a memory in communication with the one or more processors and storing instructions that, when executed by the one or more processors, are configured to cause the system to:
      dividing image data of a document into a plurality of tiles;
      identify, using a convolutional neural network (CNN) trained to recognize MICR lines, one or more tiles of the plurality of tiles containing a MICR line;
      detecting an offset among the one or more identified tiles;
      rotating the one or more identified tiles based on the detected offset; and
      recognize, using a convolutional recurrent neural network (CRNN), the characters within region image data corresponding to the one or more rotated identified tiles of the plurality of tiles containing the MICR line.

13. The system of claim 12, wherein the instructions, when executed by the one or more processors, are further configured to cause the system to:
   extract the region image data corresponding to the identified tiles from the image data; and
   provide the extracted region image data to the CRNN.

14. The system of claim 13, further comprising a camera, wherein the instructions, when executed by the one or more processors, are further configured to cause the system to control the camera to capture an image of the document, the image data of the document being provided to the CNN corresponding to the captured image.

15. The system of claim 13, wherein the CNN is trained to recognize MICR lines based in part on a location within the image data.

16. The system of claim 12, wherein the CNN is trained to recognize an appearance of portions of MICR lines.

17. The system of claim 13, wherein the document is creased, crumpled, or torn.

18. The system of claim 13, wherein the CNN comprises:
   a first convolutional layer,
   a second convolutional layer, first and second rectifier layers respectively following the first and second convolutional layer, first and second pooling layers respectively following the first and second rectifier layers, a sigmoid layer following the second pooling layer, a dropout layer following the sigmoid layer, and three fully-connected layers following the dropout layer.

19. The system of claim 18, wherein:

the three fully-connected layers respectively comprise at least 5000 neurons, 2000 neurons, and 1000 neurons, and the three fully-connected layers respectively comprise less than 10000 neurons, 5000 neurons, and 2000 neurons.

20. The system of 12, wherein:

the one or more processors are further configured to cause the system to crop the one or more rotated identified tiles, and the region image data corresponds to the one or more cropped and rotated identified tiles.

* * * * *